Feb. 6, 1940.   J. KRIES   2,189,667
VEHICLE TOWING CONNECTOR
Filed May 23, 1938
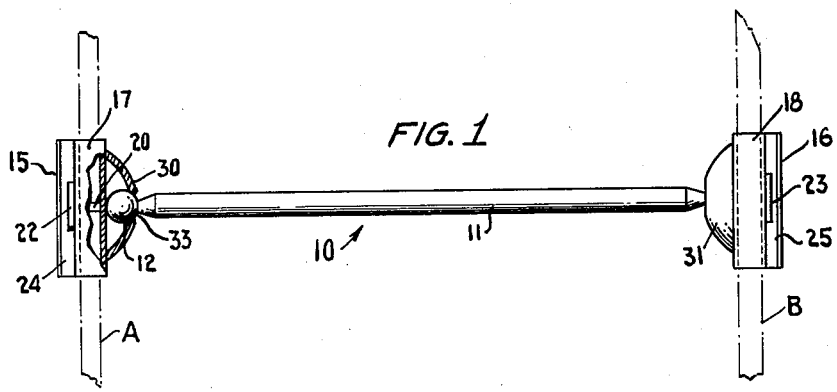
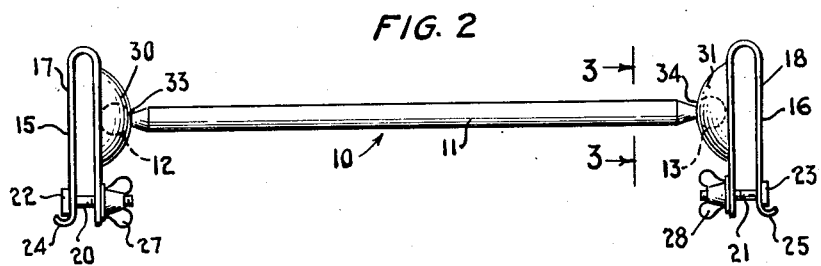
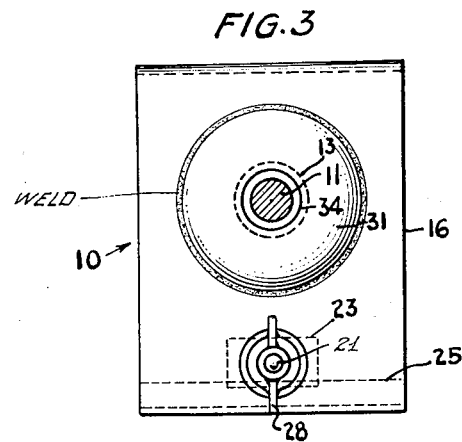 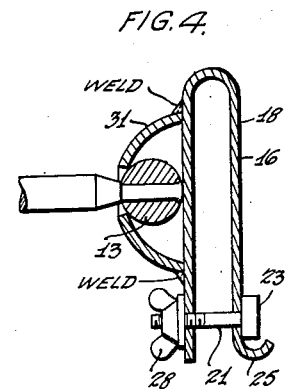
JOHN KRIES, INVENTOR
BY Victor J. Evans & Co.
ATTORNEYS Patented Feb. 6, 1940

2,189,667

UNITED STATES PATENT OFFICE 2,189,667

VEHICLE TOWING CONNECTOR

John Kries, Glendale, N. Y.

Application May 23, 1938, Serial No. 209,556

2 Claims. (Cl. 280—33.14)

This invention relates to improvements in vehicle towing connectors and more especially to a new and improved type of towing connector adapted to engage with portions of vehicle bumpers, whereby towing connection between vehicles is easily and conveniently established.

It is one of the important objects of the present invention to provide a vehicle towing connector having end portions adapted to engage with parts of vehicle bumpers, whereby the towing connector can be easily and conveniently connected to the vehicle bumpers thereby integrating, for purposes of towing, two vehicles.

Another object of the present invention is to provide a towing connector including clamps adapted to overlie and engage with portions of vehicle bumpers whereby said clamps can be easily and conveniently mounted in position on said bumper portions and retained in position thereon by easily adjusted locking means.

Another object of the instant invention is to provide a relatively strong but withal flexible, towing connector engageable with vehicle bumper portions, wherein clamps are included, mounted on end portions of a connector member proper, whereby substantial movement and play of said connector member proper, relative to said clamps, is at least not precluded.

One of the most important advantages of the novel vehicle towing connector according to the present invention is that it is well adapted to use with vehicles of different types, that is to say, the clamping portion of the connector member is suited to engage with portions of bumpers of different sizes and shapes.

An important practical feature of the novel vehicle towing connector according to the present invention, is that it comprises comparatively few parts or elements, all of which are well suited to fabrication on automatic machinery from materials commonly available, whereby economies during the course of manufacture of the device are facilitated.

Another feature of the novel towing connector according to the instant invention, is its ruggedness of construction, whereby it is well suited to withstand continuous and hard usage without dislocation or wear of the parts thereof.

Other objects, advantages and features of the device according to the present invention will be apparent to those skilled in the art during the course of the following description.

Regarded in certain of its broader aspects, the novel towing connector according to the present invention comprises a straight rod having clamps mounted on the ends thereof by means including ball and socket joints, said clamps being adapted to receive and engage with portions of vehicle bumpers.

In order to facilitate a fuller and more complete understanding of the present invention, a specific embodiment thereof will be hereinafter described, it being clearly understood, however, that the illustrated embodiment is given solely by way of example and is nonlimitative upon the scope of the present invention, except as expressed in the subjoined claims.

Referring now to the drawing:

Figure 1 is substantially a top plan view in the now preferred embodiment of the invention, with parts broken away for clearness and shows the device in position upon vehicle bumpers, the latter illustrated in phantom, Figure 2 is substantially a side elevational view of the device illustrated in Figure 1, Figure 3 is susbtantially a vertical sectional view of Figure 2, taken along the line 3—3, and Figure 4 is essentially a vertical sectional view of one end of the device illustrated in Figure 1.

Referring now especially to Figures 1 and 2, it will be noted that the vehicle towing connector, generally designated by the numeral 10, comprises a substantially straight rod 11, having essentially spherical formations 12 and 13 formed integral therewith on the ends thereof, said spherical formations preferably having a greater gross diameter than the diameter of the rod 11. Clamps generally designated by the numerals 15 and 16 are mounted on the ends of said rod 11, by engagement of parts of said clamps with said substantially spherical formations 12 and 13 hereinbefore referred to.

The clamps 15 and 16, each comprises a U-shaped member, 17 and 18, respectively, said U-shaped member being adapted to overlie and rest upon a portion of a vehicle bumper, A and B respectively, whereby parts of said vehicle bumper are positioned between the extended arms of said U-shaped member.

To facilitate holding the clamps in position on the bumpers, openings are formed in the arms of the U-shaped members near the free ends thereof, said openings being adapted to receive threaded bolts 20 and 21 respectively, substantially as shown in Figure 2.

It will be noted that the bolts 20 and 21 are provided with elongate heads 22 and 23 respectively, which engage with turned-up end portions 24 and 25 respectively of the U-shaped members 17 and 18, whereby rotative movement of said threaded bolts 20 and 21 relative to said U-shaped members 17 and 18, is at least largely limited. Integrally threaded wing nuts 27 and 28 engageable with the threaded portions of the bolts 20 and 21, serve to press the arms of the U-shaped members 17 and 18 respectively, toward each other, thereby facilitating holding of the clamps on vehicle bumpers. It will be noted that the bolts 20 and 21, when in position preclude disengagement of the U-shaped member from vehicle bumper portions positioned between the arms thereof.

Substantially hollow convexed dish-shaped elements 30 and 31, essentially fixedly mounted on portions of the clamps 15 and 16 respectively, are provided for engagement with the essentially spherical formations 12 and 13 on the ends of the rod 11, whereby the clamps and the rod are flexibly connected, the term flexible being used in the sense that the connection is readily adjustable to meet the requirements of changing conditions of use. To promote this end, openings 33 and 34 are provided in the elements 30 and 31 respectively, said openings being essentially circular in outline and of a diameter less than the gross external diameter of the spherical formations 12 and 13, but substantially larger than the external diameter of the rod 11 at the place of connection to said substantially spherical formations, whereby in effect, a ball and socket joint is provided between the rod and the clamp.

As presently manufactured, the device is assembled by initially forming the U-shaped members, one of which is designated by the numeral 18 and separately assembling the dish-shaped element 31 upon the rod 11 between the relatively large central portion of the rod and the ball 13 formed on the end thereof. It is preferred to form this assembly by tapering the end portion of the rod and piercing a ball, the dish-shaped member being fitted upon the tapered end of the rod and thereafter the ball positioned on the rod and swaged thereon. In this manner a unitary assembly of the three parts is produced with free play permitted the rod and attached ball. When so assembled the dish-shaped members, one of which is designated by the numeral 31 is united to the U-shaped member 18, above mentioned, by welding in a manner such that to all intents and purposes the dish-shaped member and the U-shaped brackets are integral with each other. These details are well illustrated in Fig. 4 of the drawing.

In use, the device is mounted on vehicle bumpers substantially as shown in Figure 1, the bumpers being designated by the letters A and B. The clamp elements 15 and 16 are engaged with the bumpers whereby portions of the bumpers are positioned between the extending arms of the U-shaped members and the bolts hereinbefore referred to, received in openings near the free ends of the U-shaped members, are passed through said openings and tightened, whereby the U-shaped members are held in substantially fixed position on the bumpers.

It will be seen then that the essentially straight rod 11 will serve as a flexible connection between the clamps 15 and 16 and accordingly will assist in towing of one vehicle by another when said vehicles are connected in the manner hereinbefore described.

It is to be understood that this improvement is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. A vehicle towing connector comprising a substantially straight rod having an essentially spherical formation integral therewith, on each end thereof; and a pair of vehicle bumper clamps, one of said clamps being mounted on each end of said rod, each of said clamps comprising a U-shaped member adapted to being positioned with a portion of a vehicle bumper between the arms thereof, means for holding said member on said bumper, and a hollow convexed, dish-like element mounted on and fixedly attached to said clamp, said element having an opening formed therein adapted to receive the end portion of said rod and freely engage with said essentially spherical formation thereof whereby said rod and clamp are essentially flexibly connected.

2. A vehicle towing connector comprising a substantially straight rod having an essentially spherical formation integral therewith, on each end thereof; and a pair of vehicle bumper clamps, one of said clamps being mounted on each end of said rod, each of said clamps comprising a U-shaped member adapted to being positioned with a portion of a vehicle bumper between the arms thereof, means for holding said member on said bumper comprising a threaded bolt mounted in openings formed in the free ends of said arms, a head on said bolt for limiting rotation thereof engageable with portions of said U-shaped member, a cooperating threaded wing nut for said bolt, and a hollow convexed, dish-like element, mounted on and fixedly attached to said clamp, said element having an opening formed therein adapted to receive an end portion of said rod and freely engage with said essentially spherical formation thereof whereby said rod and clamp are essentially flexibly coupled.

JOHN KRIES.